(12) United States Patent
Wang

(10) Patent No.: US 7,609,066 B2
(45) Date of Patent: Oct. 27, 2009

(54) APPARATUS AND METHOD FOR MEASURING MICRO-RESISTIVITY ANISOTROPY

(75) Inventor: Tsili Wang, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/683,754

(22) Filed: Mar. 8, 2007

(65) Prior Publication Data
US 2007/0257677 A1 Nov. 8, 2007

Related U.S. Application Data

(63) Continuation-in-part of application No. 11/416,590, filed on May 3, 2006, now Pat. No. 7,545,145.

(51) Int. Cl.
*G01V 3/20* (2006.01)
(52) U.S. Cl. ............................ 324/367; 702/7; 702/11
(58) Field of Classification Search ............... 324/355, 324/366, 367, 368, 369, 370, 371, 372, 373, 324/374, 375; 702/6, 7, 11
See application file for complete search history.

(56) References Cited

U.S. PATENT DOCUMENTS

| | | | |
|---|---|---|---|
| 2,930,969 A | 3/1960 | Baker | |
| 3,076,138 A | 1/1963 | Stelzer | |
| 4,468,623 A | 8/1984 | Gianzero et al. | |
| 5,502,686 A | 3/1996 | Dory et al. | |
| 5,850,624 A | 12/1998 | Gard et al. | |
| 6,191,588 B1 | 2/2001 | Chen | |
| 6,342,784 B1 | 1/2002 | Wollin | |
| 6,348,796 B2 | 2/2002 | Evans et al. | |
| 6,765,386 B2 | 7/2004 | Gianzero et al. | |
| 2003/0197510 A1 | 10/2003 | Gianzero et al. | |
| 2003/0222651 A1 | 12/2003 | Tabanou | |
| 2004/0051531 A1 | 3/2004 | Chemali et al. | |
| 2005/0088181 A1* | 4/2005 | Barber et al. ............... 324/346 |
| 2005/0242819 A1 | 11/2005 | Gold et al. | |
| 2005/0264295 A1 | 12/2005 | Strack et al. | |
| 2006/0290354 A1 | 12/2006 | Fredette et al. | |
| 2007/0007967 A1 | 1/2007 | Itskovich et al. | |
| 2007/0030008 A1 | 2/2007 | Cheung et al. | |
| 2007/0216417 A1 | 9/2007 | Ritter et al. | |

FOREIGN PATENT DOCUMENTS

| CA | 685727 | 5/1960 |
|---|---|---|
| WO | WO 2005006023 | 1/2005 |

OTHER PUBLICATIONS

Horn, et al. Matrix Analysis. Feb. 23, 1990. pp. 23-24.
International Search Report for International application No. PCT/US07/10673. Mailed. Feb. 20, 2008. Date of Publication Apr. 10, 2008.

\* cited by examiner

*Primary Examiner*—Patrick J Assouad
*Assistant Examiner*—David M. Schindler
(74) *Attorney, Agent, or Firm*—Cantor Colburn LLP

(57) ABSTRACT

A method for measuring anisotropy in thin-bed formations calls for placing a logging tool into a borehole in the formation and applying current to at least one set of injection electrodes and at least one set of return electrodes to measure resistivity in the formation. Resistivity measurements are used to determine aspects of thin-bed formations exposed in the borehole to the tool. The aspects include the formation azimuth angle ($\Theta$) and the formation dip angle ($\theta$). Typically, the measurements and determinations are completed using apparatus including a computer program product.

13 Claims, 7 Drawing Sheets

Horizontal (azimuthal) excitation

Vertical excitation

Horizontal (azimuthal) excitation

Vertical excitation

US 7,609,066 B2

APPARATUS AND METHOD FOR MEASURING MICRO-RESISTIVITY ANISOTROPY

CROSS REFERENCE TO RELATED APPLICATIONS

This application is filed under 37 CFR §1.53(b) as a Continuation-In-Part and claims priority under 35 U.S.C. §120 to U.S. patent application Ser. No. 11/416,590, filed May 3, 2006, now U.S. Pat. No. 7,545,145 the entire disclosure of which is incorporated herein by reference in its entirety.

BACKGROUND OF THE INVENTION

1. Field of the Invention

The invention is related generally to the field of interpretation of measurements made by well logging instruments for the purpose of determining the properties of earth formations.

2. Description of the Related Art

Electrical, electromagnetic induction, and wave propagation logging tools are commonly used for determination of electrical properties of formations surrounding a borehole. These logging tools give measurements of apparent resistivity (or conductivity) of the formation that, when properly interpreted, provide information regarding petrophysical properties of the formation and the fluids therein.

Due to the complexity and variation within some formations, accurate determinations of formation resistivity and other quantities may be difficult to obtain. For example, in the case of thinly laminated sand and shale sequences, it is difficult to accurately resolve the electrical properties of the individual beds or laminates and thus to ascertain information regarding the presence of hydrocarbon deposits.

That is, some of the thin beds or regions of thin laminates are below the resolution of logging tools and are usually interpreted as anisotropic formations. The measurements taken provide indications of bulk anisotropic resistivity, which are then further evaluated to provide indications of formation properties.

To interpret the anisotropy measurement for a sand and shale sequence, bulk resistivity is determined for both the transverse direction and the normal direction. Relations between the determined bulk resistivities and the predicted bulk resistivities are used to calculate the sand bed resistivity. Prediction of the bulk resistivities calls for knowledge of the resistivity of the shale component. Because shales are often anisotropic, knowledge of the shale anisotropy must be available in order to accurately relate the bulk resistivities to the sand resistivity and thus accurately calculate the sand resistivity from the measurement, which. will depend on the shale anisotropy. Determination of the shale anisotropy in a sand and shale sequence is difficult because the bed thickness is beyond the resolution capabilities of most logging tools. At present, borehole imaging methods seem to be the only choice for measuring microscopic formation (shale) anisotropy in situ.

One exemplary tool for such imaging is disclosed in U.S. Pat. No. 6,191,588, entitled "Methods and Apparatus for Imaging Earth Formations with a Current Source, a Current Drain, and a Matrix of Voltage Electrodes Therebetween," issued Feb. 20, 2001 to Chen. One method for use of this apparatus is disclosed in U.S. Pat. No. 6,765,386, entitled "Galvanic Method of Measuring Electrical Anisotropy" issued Jul. 20, 2004 to Gianzero et al. The disclosures of both of these patents are incorporated herein by reference in their entirety.

Referring to U.S. Pat. No. 6,191,588, the borehole imaging apparatus includes a tool having an array of voltage electrode buttons mounted on a non-conductive pad. A current source and a current return are preferably located on the non-conductive pads at opposite ends thereof. The locations of the current source and return are designed to force a current to flow in the formation parallel to the pad face and non-parallel to the formation boundary layers. The voltage difference between a pair of buttons in the array is proportional to the resistivity of the formation bed adjacent to the buttons. The ratio of voltage differences between two nearby pairs of electrode buttons provides a quantitative measurement of the ratio of shallow resistivity. The resolution of the image produced by the tool is determined only by the spacing of the buttons.

However, when a trajectory of the borehole through which the apparatus travels is not perpendicular to a bedding plane, prior art techniques do not correctly characterize the formation resistivity.

What is needed is a method for measuring thin-bed resistivity anisotropy using an electrical or electromagnetic based well logging tool. Preferably, the method consistently provides accurate and reliable data without regard for the trajectory of the borehole and is computationally efficient.

BRIEF SUMMARY OF THE INVENTION

Disclosed is a method for determining micro resistivity anisotropy in a formation, that includes inserting a logging tool in a borehole in the formation, wherein the tool has a first set of electrodes disposed along an x-axis and a second set of electrodes disposed along an z-axis, wherein each set of electrodes has an injection electrode, a return electrode spaced therefrom and a plurality of measuring electrodes disposed therebetween; driving a current between each injection electrode and each return electrode to create an electric field; measuring a potential difference in the electric field between each of the injection electrodes and return electrodes with the respective measuring electrodes to produce, for the first set of electrodes, a potential difference for x-directed excitation ($V_{xx}$) and a potential difference for z-directed excitation ($V_{xz}$), and for the second set of electrodes, a potential difference for the z-directed excitation ($V_{zx}$) and a potential difference for the x-directed excitation ($V_{zz}$); and composing a potential difference tensor (V) from the potential difference components $V_{xx}$, $V_{xz}$, $V_{zx}$ and $V_{zz}$.

Also disclosed is a method for determining micro resistivity anisotropy in a formation, that calls for inserting a logging tool in a borehole in the formation, wherein the tool has a first set of electrodes disposed along an x-axis, a second set of electrodes disposed along a y-axis, and a third set of electrodes disposed along a z-axis, wherein each set of electrodes has an injection electrode, a return electrode spaced therefrom and a plurality of measuring electrodes disposed therebetween; driving a current between each injection electrode and each return electrode to create an electric field; measuring a potential difference in the electric field between each of the injection electrodes and return electrodes with the respective measuring electrodes to produce, for the first set of electrodes, potential difference vectors $V_{xx}$, $V_{xy}$ and $V_{xz}$; and for the second set of electrodes, potential difference vectors $V_{yx}$, $V_{yy}$ and $V_{yz}$; and for the third set of electrodes, potential difference vectors $V_{zx}$, $V_{zy}$ and $V_{zz}$; composing a potential difference tensor (V) from the potential difference components $V_{xx}$, $V_{xy}$, $V_{xz}$, $V_{yx}$, $V_{yy}$, $V_{yz}$, $V_{zx}$, $V_{zy}$ and $V_{zz}$.

Further disclosed is a computer program product stored on machine readable media, the product comprising instructions for measuring anisotropy of a formation by making micro-resistivity measurements, the instructions including instructions for operating a logging tool, wherein the tool has a first set of electrodes disposed along a first axis (x-axis), a second set of electrodes disposed along a second axis (y-axis), wherein each set of electrodes has an injection electrode, a return electrode spaced therefrom and a plurality of measuring electrodes disposed therebetween; driving a current between each injection electrode and each return electrode to create the electric field; measuring a potential difference between each of the injection electrodes and return electrodes with the respective measuring electrodes to produce, for the first axis, potential difference vectors Vxx, Vxy; and for the second axis, potential difference vectors Vyx, Vyy; and solving a tensor including potential difference vectors for the first axis and the second axis to determine the potential difference (V). The computer program product includes further instructions for a third set of electrodes disposed along a third axis (z-axis); wherein the x-axis, the y-axis and the z-axis may include an orthogonal relationship with each other; where, for the first axis, the potential difference vectors have vectors Vxx, Vxy and Vxz; for the second axis, the potential difference vectors have vectors Vyx, Vyy and Vyz; and further have potential difference vectors for the third axis Vzx, Vzy and Vzz; wherein the tensor further comprises potential difference vectors for the third axis. The product further including instructions for converting the potential difference (V) to apparent resistivity (R) for the formation and rotating the apparent resistivity (R) to determine at least one of a formation azimuth angle (j) and a formation dip angle (θ).

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several Figures.

DETAILED DESCRIPTION OF THE INVENTION

Figure 1:
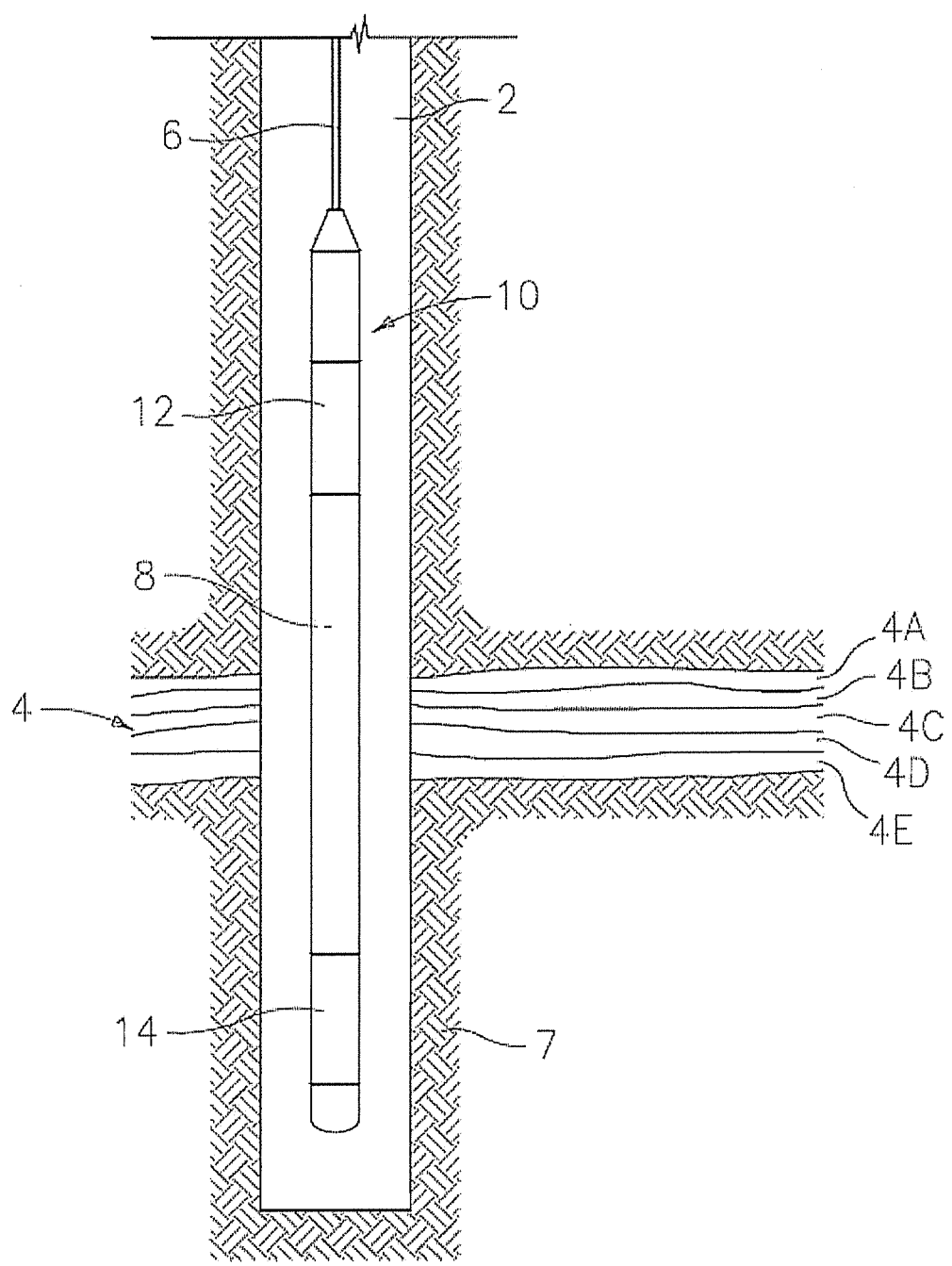
FIG. 1 depicts aspects of a well bore.

Referring to FIG. 1, a well logging instrument 10 is shown disposed in a borehole 2. The borehole 2 is drilled through earth 7 and penetrates formations 4, which include various layers 4A-4E. The instrument 10 is typically lowered into and withdrawn from the borehole 2 by use of an armored electrical cable 6 or similar conveyance as is known in the art. The instrument 10 is typically assembled from three subsections: an auxiliary electronics unlit 14 disposed at one end of the instrument 10; a mandrel unit 8 attached to the auxiliary electronics unit 14; and an electronics unit 12 attached to the other end of the mandrel unit 8, the electronics unit 12 typically being attached to the cable 6. As used herein, the well logging instrument 10 may also be referred to as a "tool 10" or in other similar terms.

In typical embodiments, the borehole 2 includes materials such as would be found in oil exploration, including a mixture of liquids including water, drilling fluid, mud, oil and formation fluids that are indigenous to the various formations. One skilled in the art will recognize that the various features as may be encountered in a subsurface environment may be referred to as "formations." Accordingly, it should be considered that while the term "formation" generally refers to geologic formations of interest, that the term "formations," as used herein, may, in some instances, include any geologic points of interest (such as a survey area).

The instrument 10 includes at least one injection electrode and at least one return electrode. The electrodes are also referred to as a "source electrode" and a "drain electrode," respectively. The electrodes, as will be further explained, are for inducing electromagnetic fields in the formations 4 and for receiving voltage signals induced by eddy currents flowing in the formations 4 as a result of the electromagnetic fields induced therein.

The auxiliary electronics unit 14 typically contains a receiver, signal processing capabilities and telemetry capabilities (not shown). The auxiliary electronics unit 14 also typically includes a signal generator and power amplifiers (not shown), which causes current of selected properties to flow through the electrodes of the instrument 10.

In typical embodiments, the electronics unit 12 includes receiver circuits (not shown) for detecting voltages induced in the return electrodes of the mandrel unit 8, and circuits for processing these received voltages (not shown) into signals representative of the conductivities of various layers 4A-4E of the formations 4. As a matter of convenience, the electronics unit 12 typically includes signal telemetry to transmit conductivity related signals to the surface of the earth 7 via the cable 6 for further processing. Alternatively, the electronics unit 12 can store the conductivity related signals in an appropriate recording device (not shown) for processing after the instrument 10 is withdrawn from the borehole 2.

In order to provide a context for the teachings herein, it is important to discuss certain physical and geometric relationships. As discussed herein, there are four coordinate systems involved in the processing of multi-component induction logging data. The four coordinate systems include one for each of the earth 7, the formation 4, the instrument 10 and the electrodes 3. In typical embodiments, and by convention herein, the earth 7 coordinate system has a z-axis Z in the direction of gravity, an x-axis X pointing to the magnetic North, and a y-axis Y in the direction of magnetic East. The other three coordinate systems are defined relative to the earth coordinate system 20, depicted in FIG. 2A.

Figure 2A:
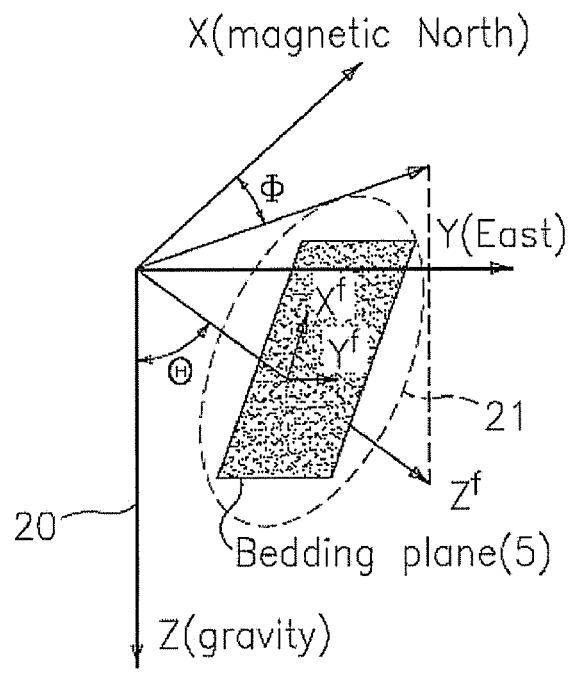
FIG. 2A and FIG. 2B, collectively referred to herein as FIG. 2, depict an earth coordinate system and a formation coordinate system.

Referring to FIG. 2A, the earth coordinate system 20 is shown, with the axes as described in the preceding paragraph. The formation coordinate system 21 is also depicted, and shown relative to the earth coordinate system 20. An z-axis $Z^f$ of the formation coordinate system 21 is normal to a bedding plane 5, while an x-axis $X^f$ and a y-axis $Y^f$ are on the bedding plane 5, each of the axes ($Z^f$, $X^f$, $Y^f$) being orthogonally oriented. Two formation angles, depicted as a formation dip angle (θ') and a formation azimuth angle (Φ) describe a relationship between the earth coordinate system 20 and the formation coordinate system 21. Typically, the formation dip angle (θ) and the formation azimuth angle (Φ) are determined by use of inversion processing. The tool coordinate system is depicted in FIG. 2B.

Figure 2B:
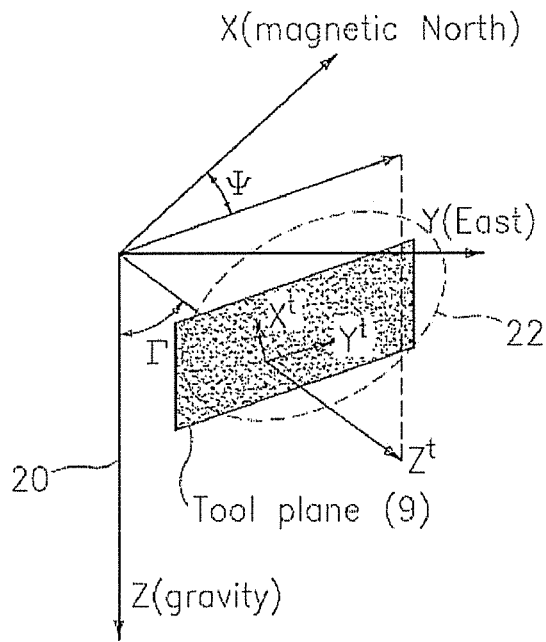

Referring to FIG. 2B, a z-axis $Z^t$ of the tool coordinate system 22 describes the trajectory of the borehole 2 and is normal to a tool plane 9. The x-axis $X^t$ and the y-axis $Y^t$ of the tool coordinate system 22 are on the tool plane, each of the axes ($Z^t$, $X^t$, $Y^t$) being orthogonally oriented. The relation of the tool coordinate system 22 to the earth coordinate system 20 is described by a tool dip angle (Ψ) and a tool azimuth angle (Γ).

Figure 3:
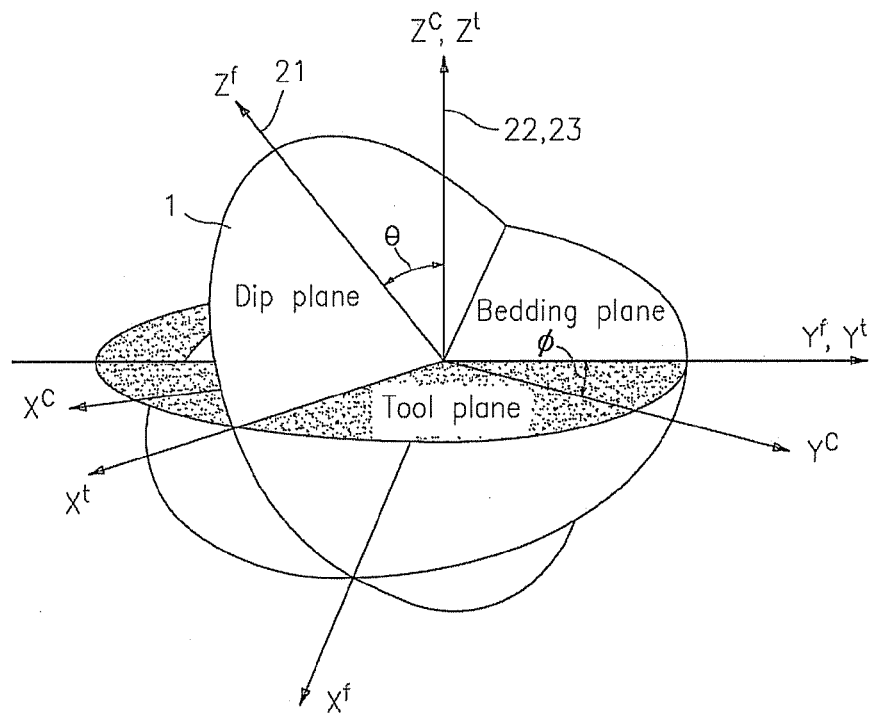
FIG. 3 depicts a tool coordinate system in conjunction with other coordinate systems.

A combination of coordinate systems is depicted in FIG. 3. More specifically, the formation coordinate system 21, the tool coordinate system 22 and an electrode coordinate system 23 are depicted in relation to each other. Referring to FIG. 3, a dip plane 1 is also shown. The dip plane 1 is described in the coil coordinate system 23, and includes an x-axis $X^c$, a y-axis $Y^c$ and a z-axis $Z^c$. The z-axis $Z^c$ of the coil coordinate system 23 shares the same z-axis $Z^t$ as the tool coordinate system 22, while the y-axis $Y^c$ of the electrode coordinate system 23 is offset from the y-axis $Y^f$ of the formation coordinate system 21 by the formation azimuth angle (Φ). A relative tool rotation angle (φ) (not shown in FIG. 3) is described by the x-axis $X^c$ for the electrode coordinate system 23, with respect to the high side of the borehole 2.

As previously mentioned, one exemplary tool for such imaging is disclosed in U.S. Pat. No. 6,191,588, entitled "Methods and Apparatus for Imaging Earth Formations with a Current Source, a Current Drain, and a Matrix of Voltage Electrodes Therebetween," issued Feb. 20, 2001 to Chen, while one method for use of this apparatus is disclosed in U.S. Pat. No. 6,765,386, entitled "Galvanic Method of Measuring Electrical Anisotropy" issued Jul. 20, 2004 to Gianzero et al. The disclosures of both of these patents are incorporated herein by reference in their entirety. However, certain aspects of imaging tools are now reviewed to establish a context for the teachings herein.

Figure 4:
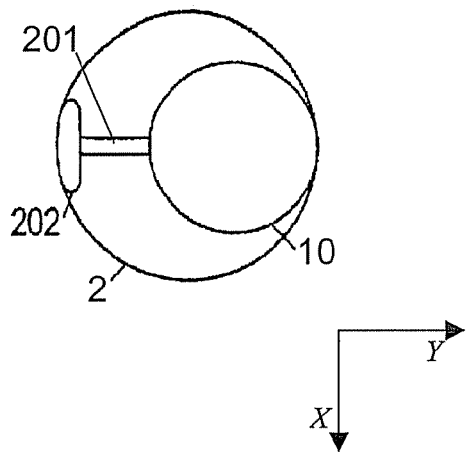
FIG. 4 depicts an end view of a well logging instrument in a borehole.

Referring to FIGS. 4-7, certain aspects of the instrument 10 are shown and discussed in greater detail. In FIG. 4, an end view of the instrument 10 with a biasing element configuration is shown. In this configuration, an arm 201 is extended to press a slider pad 202 against one wall of borehole 2. Slider pad 202 is preferably a measurement pad as described further below. Contact is assured by extending the arm 201 a sufficient distance to make the width of the instrument 10 equal to the diameter of the borehole 2. The arm 201 is preferably spring-biased against the wall to maintain contact with the borehole 2 despite irregularities in the borehole 2.

Figure 5:
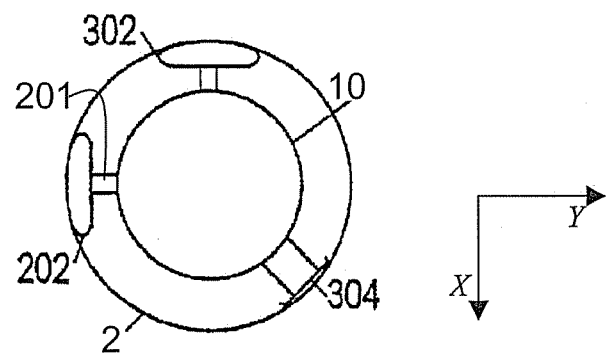
FIG. 5 depicts another embodiment of a well logging instrument in a borehole.

FIG. 5 depicts an end view of instrument 10 with an alternative biasing element configuration. In this configuration, the instrument 10 is maintained roughly in the center of the borehole 2 through the use of multiple biasing elements. At least two of these elements may be slider pads 202, 302 that perform measurements at orthogonal azimuthal angles. The total number of biasing elements is typically at least three. The number of biasing elements may include slider pads 304 that do not perform measurements.

It should be noted that many suitable biasing element configurations are known in the art and may be created in the future. Suitable biasing elements may include spring arms, bow springs, and balloons. The use of different types and numbers of biasing elements is contemplated in alternative embodiments.

Figure 6:
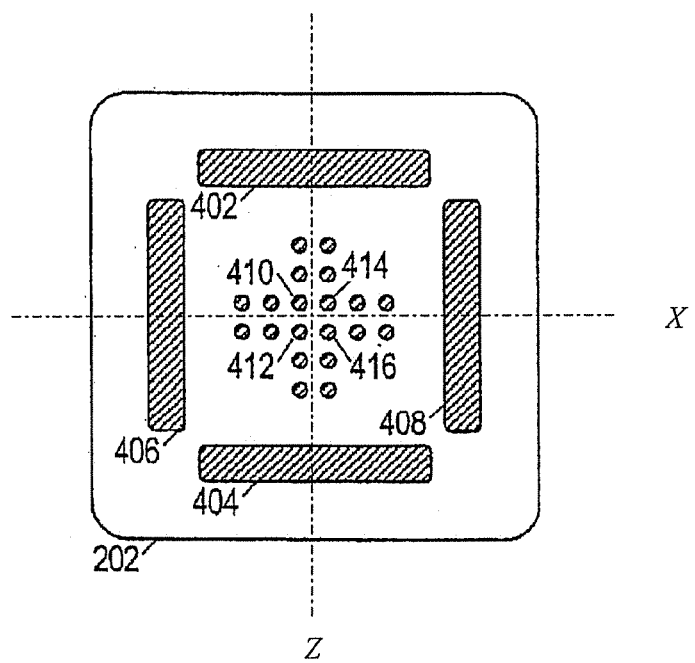
FIG. 6 depicts aspects of an electrode configuration.

FIG. 6 depicts an embodiment of an electrode configuration of a measurement pad for oil-based mud imaging. This embodiment is typically useful for obtaining a high-resolution measurement of formation resistivity in formations 4 surrounding a borehole 2 when the borehole 2 contains a nonconductive drilling mud.

In the embodiment of FIG. 6, the slider pad 202 includes a current injection electrode 402 is disposed horizontally along the upper edge of the configuration, and a current return electrode 404 is disposed horizontally along the lower edge of the configuration. A current source driver (not shown) is coupled between the source and return electrodes to force a predetermined amount of current to flow from the injection electrode 402 to the return electrode 404.

Another injection electrode 408 is disposed vertically along the right edge of the configuration, and another return electrode 406 is disposed vertically along the left edge of the electrode configuration. A second current source driver (not shown) is coupled between the another injection electrode 408 and the another return electrode 406 to force a predetermined amount of current to flow from the another injection electrode 408 to the another return electrode 406.

The current source drivers may drive AC and/or DC currents between each of the injection electrodes 402, 408 and the return electrodes 404, 406. The current source drivers may operate concurrently, or alternatively, they may operate in time-multiplexed fashion (i.e. they may take turns operating). If the current source drivers operate concurrently, it is preferred that they provide AC currents at different frequencies, but this is by no means required.

A set of measurement electrodes is provided in the region between the source and return electrodes. Each of the electrodes in the set of measurement electrodes is coupled to a respective high-input-impedance amplifier and an analog-to-digital converter (not shown) that measure the voltage signal from the respective measurement electrode. The sampled voltages may be processed while the instrument 10 is downhole, and in any event, are communicated to the surface data acquisition and storage unit.

In the set of measurement electrodes shown in FIG. 6, four measurement electrodes 410-416 are identified in particular. These measurement electrodes are symmetrically located with respect to the horizontal and vertical centerlines of the electrode configuration (depicted by dashed lines), and are proximate to the center of the electrode configuration. The voltages from these electrodes call be used to estimate desired resistivity measurement using techniques as are known in the art.

The electrode configuration of FIG. 4 is preferably located on (or in) a nonconductive surface that contacts the wall of the borehole 2. Accordingly, the surface may (for example) be a ceramic, plastic, or rubber surface having a curvature designed to match the curvature of the well bore wall.

Figure 7:
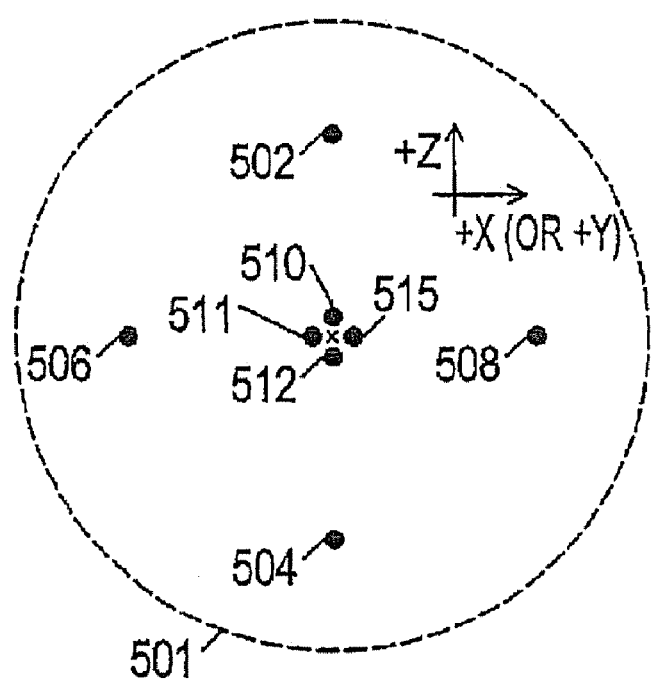
FIG. 7 depicts aspects of another electrode configuration.

FIG. 7 shows aspects of another embodiment of the electrode configuration. In this embodiment, the measurement electrodes (510, 511, 512, 515), the injection electrodes (502, 508) and the return electrodes (504, 506) are point contacts, or at least modeled thereas. That is, injection electrode 402 is modeled as a point current source 502, return electrode 404 is modeled as a point current drain 504, injection electrode 408 is modeled as a point current source 508, and return electrode 406 is modeled as a point current drain 506.

In this embodiment, voltage measurements are made at points 510 and 512, which are closely spaced measurement points located on centerline between points 502 and 504, and located symmetrically with respect to a centerline between points 506 and 508. Similarly, voltage measurements are made at points 515 and 511, which are closely spaced measurement points located on the centerline between points 506 and 508, and located symmetrically with respect to the centerline between points 502, 504.

Referring to prior art techniques for micro-resistivity measurements, when a trajectory for the borehole 2 is perpendicular to the bedding plane 5, two measurements have been used to characterize anisotropy of the surrounding formation 4. The first measurement being the horizontal resistivity (parallel to the bedding plane 5), the second measurement being the vertical resistivity (parallel to the borehole 2).

Typically, to measure the horizontal resistivity, an electric field is established in the horizontal direction. With reference to FIG. 6, establishing the electric field is accomplished by injecting electric current through the injection electrode 408 and receiving the electric current through the respective return electrode 406. In this situation, the injection electrode 408 and the return electrode 406 are azimuthally separated relative to the borehole 2. The resulting horizontal electric field $V_x$ thus generated is measured using at least two of the measurement electrodes (for example, measurement electrode 416 and measurement electrode 412). The apparent horizontal resistivity may be calculated using the equation:

$$Rx = Kx \frac{Vx}{I}; \tag{1}$$

where $K_x$ represents a geometric factor in the x-direction, $V_x$ represents a potential difference between the measurement electrodes, and I represents the injection current.

Similarly, for measurement of the vertical resistivity, an electric field is generated in the vertical direction by transmitting and receiving electric current through vertically offset electrodes. The vertical potential difference is measured by two measurement electrodes between the injection electrode 402 and the return electrode 404. The apparent vertical resistivity is calculated as:

$$Rz = Kz \frac{Vz}{I}; \tag{2}$$

where $K_z$ represents the geometric factor in the z-direction, $V_z$ represents a potential difference between the measuring electrodes, and I represents the injection current.

However, when a trajectory of the borehole 2 through which the instrument 10 travels is not perpendicular to the bedding plane 5, the prior art techniques do not correctly characterize resistivity of the formation 4. In accordance with the teachings herein, and particularly for situations where the trajectory of the borehole 2 is not perpendicular to the bedding plane 5, a full tensor measurement is made.

Figure 8A:
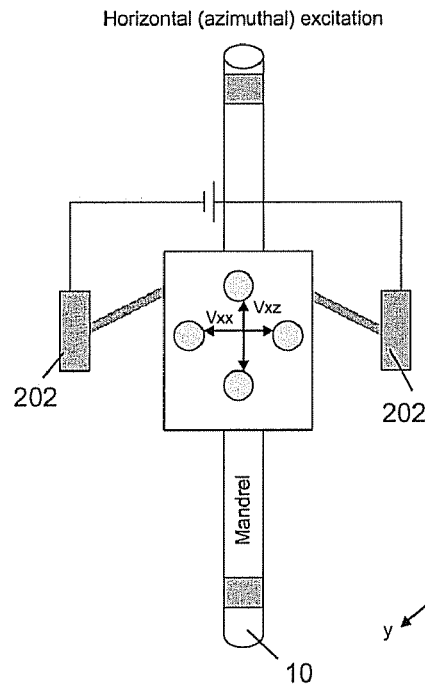
FIG. 8A and FIG. 8B, collectively referred to herein as FIG. 8, depict aspects of electrode arrangements for measuring potential differences.
Figure 8B:
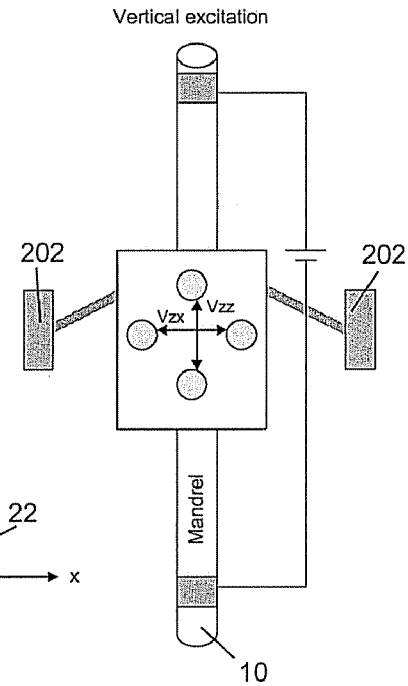

Consider the electrode arrangement of FIG. 8. In FIG. 8, potential differences are measured in both the horizontal direction (x-axis) and vertical direction (z-axis). These measurements are completed using at least one horizontal 408 injection electrode and at least one correlating horizontal return electrode 406, as well as at least one vertical 402 injection electrode and at least one correlating vertical return electrode 404.

These measurements yield the horizontal potential difference $V_{xx}$ and the vertical potential difference $V_{xz}$ for the horizontal injection and return direction. Similarly, the horizontal potential difference $V_{zx}$ and the vertical potential difference $V_{zz}$ for the vertical injection and return direction are determined. The measured quantities for potential differences are assembled into a tensor:

$$V = \begin{pmatrix} Vxx & Vzx \\ Vxz & Vzz \end{pmatrix}. \tag{3}$$

The tensor V is then converted into an apparent resistivity tensor, R:

$$R = \begin{pmatrix} Vxx & Vzx \\ Vxz & Vzz \end{pmatrix} \begin{pmatrix} Kx/Ix & \\ & Kz/Iz \end{pmatrix}; \tag{4}$$

$$R = \begin{pmatrix} Rxx & Rzx \\ Rxz & Rzz \end{pmatrix}$$

where $K_x$ and $K_z$ represent geometric factors of the tool for horizontal (azimuthal) excitation and vertical excitation, respectively and $I_x$ and $I_z$ are the injection currents in the x- and z-directions, respectively.

A rotation is applied to the apparent resistivity tensor R such that:

$$\Theta^T R \Theta = \begin{pmatrix} Rh & \\ & Rv \end{pmatrix}; \tag{5}$$

where $$\Theta = \begin{pmatrix} \cos\theta & \sin\theta \\ -\sin\theta & \cos\theta \end{pmatrix} \text{ and}$$

$R_h$ represents the formation resistivity parallel to the bedding plane 5 and $R_v$ represents the formation resistivity perpendicular to the bedding plane 5, and $\theta$ represents an angle between the bedding plane 5 and the tool axis $Z^t$.

Advantageously, it is not required that the electrode pairs (the at least one horizontal injection electrode 408 and the correlating horizontal return electrode 406) be parallel or perpendicular to the tool axis $Z^t$. As an example, consider the arrangement of FIG. 9.

Figure 9A:
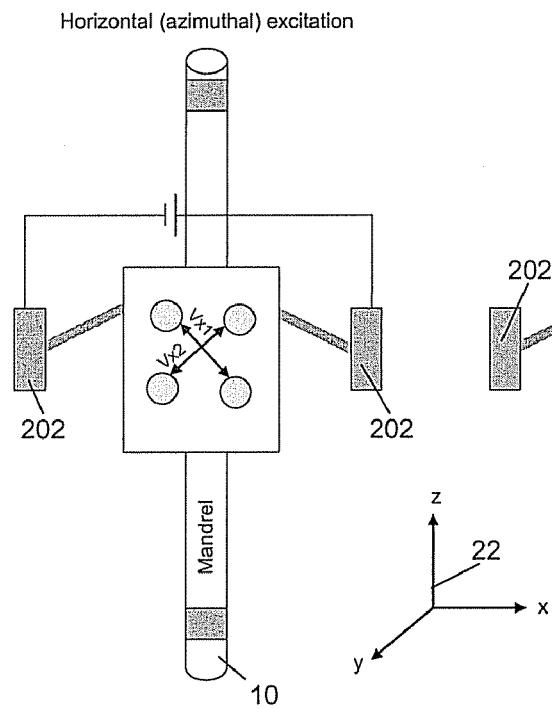
FIG. 9A and FIG. 9B, collectively referred to herein as FIG. 9, depict aspects of electrode arrangements for measuring orthogonal potential differences.
Figure 9B:
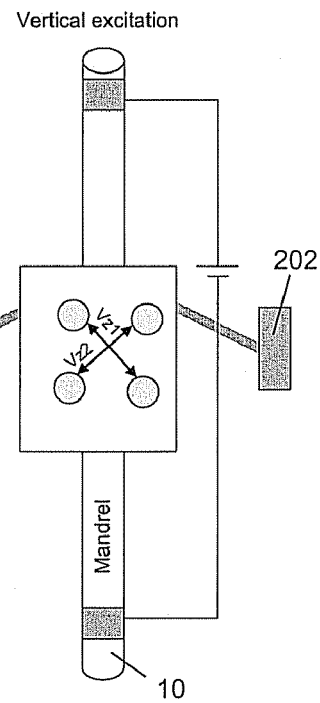

In FIG. 9, the horizontal injection electrode 408 and the correlating horizontal return electrode 406 are arranged in another configuration. Common to the arrangements of FIG. 8 and FIG. 9, the pairs of horizontal and vertical electrodes are orthogonally arranged with regard to each other.

In the general case, a full three by three tensor potential difference measurement can be made by employing a third excitation and a third set of measurement electrodes that are orthogonal to the x-direction (disposed along the y-axis). Exemplary implementations of the third set of electrodes include electrodes disposed within an orthogonally related slider pad 302. In this embodiment, with regard to x-excitation, three potential differences are measured, Vxx, Vxy, and Vxz. Combining the measurements from the x-excitation, the y-excitation and the z-excitation, gives the tensor potential measurement of:

$$V = \begin{pmatrix} Vxx & Vyx & Vzx \\ Vxy & Vyy & Vzy \\ Vxz & Vyz & Vzz \end{pmatrix}; \quad (6)$$

from which an apparent tensor resistivity R can be calculated:

$$R = \begin{pmatrix} Vxx & Vyx & Vzx \\ Vxy & Vyy & Vzy \\ Vxz & Vyz & Vzz \end{pmatrix} \begin{pmatrix} Kx/Ix & & \\ & Ky/Iy & \\ & & Kz/Iz \end{pmatrix}; \quad (7)$$

$$R = \begin{pmatrix} Rxx & Ryx & Rzx \\ Rxy & Ryy & Rzy \\ Rxz & Ryz & Rzz \end{pmatrix}$$

where Kx represents a geometric factor of the tool for the x-directed excitation; Ky represents a geometric factor of the tool for the y-directed excitation; and Kz represents a geometric factor of the tool for the z-directed excitation; and Ix, Iy, and Iz are the injection currents in the x-axis, y-axis, and z-axis directions, respectively.

The apparent tensor resistivity R may then be rotated to give the principal resistivity components ($R_x$, $R_y$, $R_z$) the formation azimuth angle ($\phi$) and the formation dip angle ($\theta$) for the bedding plane 5 as follows:

$$\Theta^T R \Theta = \begin{pmatrix} Rx & & \\ & Ry & \\ & & Rz \end{pmatrix}. \quad (8)$$

Multiple pairs of measurement electrodes may be used to acquire potential differences at multiple azimuthal and vertical positions, increase reliability, provide for computational throughput, or for any reasons desired by system operators and tool architects.

One skilled in the art will recognize that the analysis above is applicable where the bedding plane 5 is orthogonal to the orthogonal to the y-axis. It should also be recognized that Eq. (8) provides for diagonalization of the measured resistivity tensor, R. Thus, if measurements are made with the pad along the y-axis, it is possible to recover the horizontal and vertical resistivities as well as the dip angle, $\theta$. Usually, a larger eigenvalue corresponds to the vertical resistivity and the smaller eigenvalue corresponds to the horizontal resistivity. Thus, determination of a relationship to the bedding plane 5 simply calls for the eigenvalue decomposition of Eq. (8) for each set of electrodes. The set of electrodes for which the ratio of eigenvalues is a maximum is identified as being perpendicular to the bedding plane 5.

Typically, the well logging instrument 10 includes adaptations as may be necessary to provide for operation during drilling or after a drilling process has been undertaken.

Figure 10:
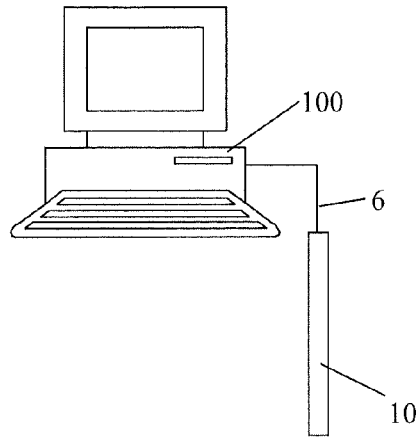
FIG. 10 depicts aspects of an apparatus for implementing the teachings herein.

Referring to FIG. 10, an apparatus for implementing the teachings herein is depicted. In FIG. 10, the apparatus includes a computer 100 coupled to the instrument 10 and the electronics unit 12 therein. Typically, the computer 100 includes components as necessary to provide for the real time processing of data from the instrument 10. Exemplary components include, without limitation, at least one processor, storage, memory, input devices, output devices and the like. As these components are known to those skilled in the art, these are neither depicted in any detail nor discussed further herein.

Typically, the teachings herein are reduced to an algorithm that is stored on machine readable media. The algorithm is implemented by the computer 100 and provides operators with desired output. The output is typically generated on a real-time basis.

As used herein generation of data in "real-time" is taken to mean generation of data at a rate that is useful or adequate for making decisions during or concurrent with processes such as production, experimentation, verification, and other types of surveys or uses as may be opted for by a user or operator. As a non-limiting example, real-time measurements and calculations may provide users with information necessary to make desired adjustments during the drilling process. In one embodiment, adjustments are enabled on a continuous basis (at the rate of drilling), while in another embodiment, adjustments may require periodic cessation of drilling for assessment of data. Accordingly, it should be recognized that "real-time" is to be taken in context, and does not necessarily indicate the instantaneous determination of data, or make any other suggestions about the temporal frequency of data collection and determination.

A high degree of quality control over the data may be realized during implementation of the teachings herein. For example, quality control may be achieved through known techniques of iterative processing and data comparison. Accordingly, it is contemplated that additional correction factors and other aspects for real-time processing may be used. Advantageously, the user may apply a desired quality control tolerance to the data, and thus draw a balance between rapidity of determination of the data and a degree of quality in the data.

Figure 11:
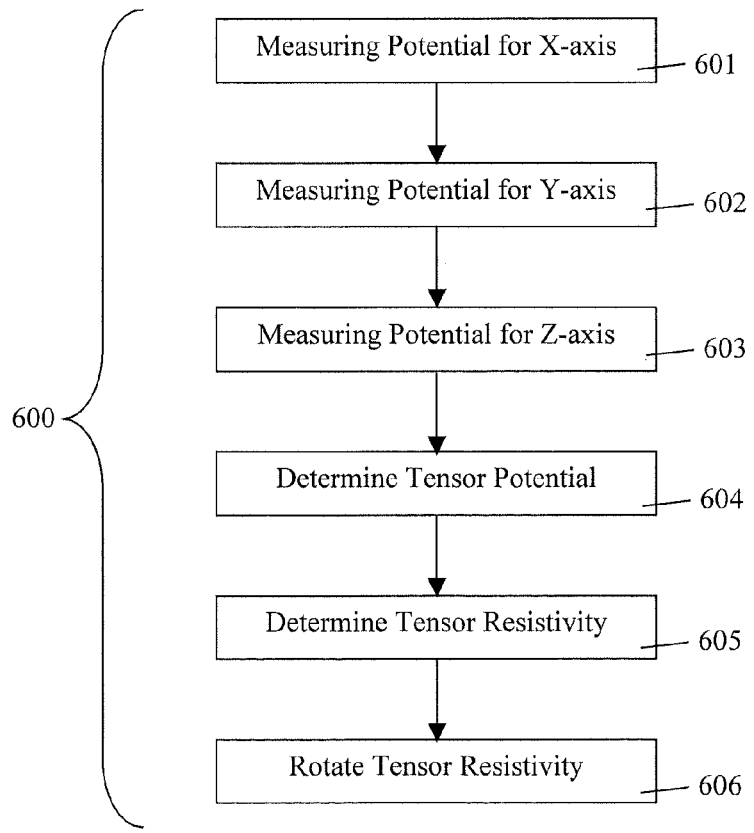
FIG. 11 depicts aspects of an exemplary method for measuring anisotropy.

In FIG. 11, aspects of an exemplary method for measuring anisotropy 600 are depicted. In FIG. 11, measuring anisotropy 600 includes measuring potential for the x-axis 601; measuring potential for the y-axis 602; measuring potential for the z-axis 603; determining tensor potential 604; determining tensor resistivity 605 and rotating the tensor resistivity 606 to produce the principal resistivity components Rx, Ry, Rz as well as the formation azimuth angle ($\phi$) and the formation dip angle ($\theta$).

The output may be used advantageously for at least one of rapid assessments of aspects of the formation 4 and adjustment to aspects of production. As one non-limiting example, the output may be used to develop and provide commands for guiding use of the instrument 10. More specifically, the output may provide operators with information that causes the generation of commands for, as one example, adjustments in drilling direction.

In support of the teachings herein, various analysis components may be used, including digital and/or an analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a sample line, sample storage, sample chamber, sample exhaust, pump, piston, power supply (e.g., at least one of a generator, a remote supply and a battery), vacuum supply, pressure supply, refrigeration (i.e., cooling) unit or supply, heating component, motive force (such as a translational force, propulsional force or a rotational force), magnet, electromagnet, sensor, electrode, transmitter, receiver, transceiver, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for determining anisotropic properties in a formation, comprising:

measuring, with respect to a coordinate system comprising an x-axis and a z-axis, a potential difference $V_{xx}$ along the x-axis using a first set of electrodes disposed along the x-axis and a potential difference $V_{xz}$ along the z-axis using a second set of electrodes disposed along the z-axis for excitation directed along the x-axis, and a potential difference $V_{zx}$ along the x-axis using the first set of electrodes and a potential difference $V_{zz}$ along the z-axis using the second set of electrodes for excitation directed along the z-axis;

producing a tensor V comprising potential difference components $V_{xx}$, $V_{xz}$, $V_{zx}$ and $V_{zz}$; and converting the tensor V to apparent resistivity R for the formation, by solving the relationship comprising $$R = \begin{pmatrix} V_{xx} & V_{zx} \\ V_{xz} & V_{zz} \end{pmatrix} \begin{pmatrix} K_x/I_x & \\ & K_z/I_z \end{pmatrix};$$

where $K_x$ represents a first geometric factor for the excitation directed along the x-axis;

$K_z$ represents a second geometric factor for the excitation directed along the z-axis;

$I_x$ represents a first injection current for the excitation directed along the x-axis; and $I_z$ represents a second injection current for the excitation directed along the z-axis.

2. The method as in claim 1, wherein the method further comprises providing on a pad at least one of the first set of electrodes disposed along the x-axis and the second set of electrodes disposed along the z-axis wherein each set of electrodes comprises an injection electrode, a return electrode spaced therefrom and a plurality of measuring electrodes disposed therebetween.

3. The method as in claim 2, wherein at least one potential difference is measured between two measurement electrodes.

4. The method as in claim 2, wherein at least one potential difference is measured between a measurement electrode and at least one of one injection electrode and one return electrode.

5. The method as in claim 1, further comprising rotating the apparent resistivity (R) to determine a dip angle (θ) between a bedding plane for the formation and an azimuth direction (φ) by solving the relationship comprising:

$$\Theta^T R \Theta = \begin{pmatrix} Rh & \\ & Rv \end{pmatrix}$$

where $$\Theta = \begin{pmatrix} \cos\theta & \sin\theta \\ -\sin\theta & \cos\theta \end{pmatrix} \text{ and }$$

$R_h$ represents resistivity of the formation in a direction parallel to the bedding plane;

$R_v$ represents resistivity of the formation in a direction perpendicular to the bedding plane;

θ represents an angle between the bedding plane and a tool axis $Z^t$; and $\Theta^T$ represents the transpose of Θ.

6. The method as in claim 1, wherein each set of electrodes comprises an injection electrode, a return electrode spaced therefrom and a plurality of measuring electrodes disposed therebetween, the first set of electrodes and the second set of electrodes comprising an orthogonal relationship with each other.

7. A method for determining anisotropic properties in a formation, comprising:

measuring, with respect to a coordinate system comprising an x-axis, a y-axis and a z-axis, a potential difference $V_{xx}$ along the x-axis using a first set of electrodes disposed along the x-axis, a potential difference $V_{xy}$ along the y-axis using a second set of electrodes disposed along the y-axis and a potential difference $V_{xz}$ along the z-axis using a third set of electrodes disposed along the z-axis for excitation directed along the x-axis; and a potential difference $V_{yx}$ along the x-axis using the first set of electrodes, a potential difference $V_{yy}$ along the y-axis using the second set of electrodes and a potential difference $V_{yz}$ along the z-axis using the third set of electrodes for excitation directed along the y-axis; and a potential difference $V_{zx}$ along the x-axis using the first set of electrodes, a potential difference $V_{zy}$ , along the y-axis using the second set of electrodes and a potential difference $V_{zz}$ along the z-axis using the third set of electrodes for excitation directed along the z-axis;

producing a tensor V from the potential difference components $V_{xx}$, $V_{xy}$, $V_{xz}$, $V_{yx}$, $V_{yy}$, $V_{yz}$, $V_{zx}$, $V_{zy}$, and $V_{zz}$; and converting the tensor V to apparent resistivity R for the formation, by solving the relationship comprising:

$$R = \begin{pmatrix} Vxx & Vyx & Vzx \\ Vxy & Vyy & Vzy \\ Vxz & Vyz & Vzz \end{pmatrix} \begin{pmatrix} Kx/Ix & & \\ & Ky/Iy & \\ & & Kz/Iz \end{pmatrix};$$

where
- $K_x$ represents a geometric factor of the tool for the excitation directed along the x-axis;
- $K_y$ represents a geometric factor of the tool for the excitation directed along the y-axis;
- $K_z$ represents a geometric factor of the tool for the excitation directed along the z-axis;
- $I_x$ represents a first injection current for the excitation directed along the x-axis;
- $I_y$ represents a second injection current for the excitation directed along the y-axis; and
- $I_z$ represents a third injection current for the excitation directed along the z-axis.

8. The method as in claim 7, wherein the method further comprises providing on a pad at least one of the first set of electrodes disposed along the x-axis, the second set of electrodes disposed along the y-axis, and the third set of electrodes disposed along the z-axis, wherein each set of electrodes comprises an injection electrode, a return electrode spaced therefrom and a plurality of measuring electrodes disposed therebetween.

9. The method as in claim 8, wherein at least one potential difference is measured between two measurement electrodes.

10. The method as in claim 8, wherein at least one potential difference is measured between a measurement electrode and at least one of one injection electrode and one return electrode.

11. The method as in claim 7, further comprising rotating the apparent resistivity (R) to determine a dip angle (θ) between a bedding plane for the formation and an azimuth direction (φ) by solving the relationship comprising:

$$\Theta^T R \Theta = \begin{pmatrix} Rx & & \\ & Ry & \\ & & Rz \end{pmatrix}; \text{ where}$$

$$\Theta = \begin{pmatrix} \cos\theta & \sin\theta \\ -\sin\theta & \cos\theta \end{pmatrix} \text{ and}$$

$R_x$ represents resistivity of the formation in the excitation directed along the x-axis;
$R_y$ represents resistivity of the formation in the excitation directed along the y-axis;
$R_z$ represents resistivity of the formation in the excitation directed along the z-axis; and
$\Theta^T$ represents the transpose of $\Theta$.

12. A computer program product stored on machine readable media, the product comprising instructions for measuring anisotropy of a formation by making resistivity measurements, the instructions comprising instructions for:

operating a first set of electrodes disposed along an x-axis, a second set of electrodes disposed along a-y-axis, and a third set of electrodes disposed along a z-axis wherein each set of electrodes comprises an injection electrode, a return electrode spaced therefrom and a plurality of measuring electrodes disposed therebetween;

measuring a potential difference $V_{xx}$ along the x-axis, a potential difference $V_{xy}$ along the y-axis, and a potential difference $V_{xz}$ along the z-axis for excitation directed along the x-axis; a potential difference $V_{yx}$ along the x-axis, a potential difference $V_{yy}$ along the y-axis, and a potential difference $V_{yz}$ along the z-axis for excitation directed along the y-axis; and a potential difference $V_{zx}$ along the x-axis, a potential difference $V_{zy}$ along the y-axis, and a potential difference $V_{zz}$ along the z-axis for excitation directed along the z-axis;

producing a tensor comprising the potential differences for the first axis and the second axis to determine the potential difference V; and converting the tensor V to apparent resistivity R for the formation, by solving the relationship comprising:

$$R = \begin{pmatrix} Vxx & Vyx & Vzx \\ Vxy & Vyy & Vzy \\ Vxz & Vyz & Vzz \end{pmatrix} \begin{pmatrix} Kx/Ix & & \\ & Ky/Iy & \\ & & Kz/Iz \end{pmatrix}; \text{ where}$$

- $K_x$ represents a geometric factor of the tool for the excitation directed along the x-axis;
- $K_y$ represents a geometric factor of the tool for the excitation directed along the y-axis;
- $K_z$ represents a geometric factor of the tool for the excitation directed along a third axis z-axis;
- $I_x$ represents a first injection current for the excitation directed along the x-axis;
- $I_y$ represents a second injection current for the excitation directed along the y-axis; and
- $I_z$ represents a third injection current for the excitation directed along the z-axis.

13. The product of claim 12, further comprising rotating the apparent resistivity R to determine a formation dip angle θ between a bedding plane for the formation and an azimuth direction φ.

* * * * *